United States Patent
George et al.

(10) Patent No.: US 9,918,008 B2
(45) Date of Patent: Mar. 13, 2018

(54) METHOD AND DEVICE FOR ASSISTING A USER TO CAPTURE IMAGES

(71) Applicants: Tomson Ganapathiplackal George, Paika (IN); Sudheesh Joseph, Kochi (IN)

(72) Inventors: Tomson Ganapathiplackal George, Paika (IN); Sudheesh Joseph, Kochi (IN)

(73) Assignee: WIPRO LIMITED, Bangalore (IN)

( * ) Notice: Subject to any disclaimer, the term of this patent is extended or adjusted under 35 U.S.C. 154(b) by 12 days.

(21) Appl. No.: 14/664,813

(22) Filed: Mar. 21, 2015

(65) Prior Publication Data
US 2016/0234433 A1    Aug. 11, 2016

(30) Foreign Application Priority Data
Feb. 6, 2015    (IN) .............................. 600/CHE/2015

(51) Int. Cl.
| | |
|---|---|
| *H04N 5/232* | (2006.01) |
| *G06T 7/13* | (2017.01) |
| *G06K 9/46* | (2006.01) |
| *G06T 7/73* | (2017.01) |
| *G06K 9/32* | (2006.01) |

(52) U.S. Cl.
CPC ....... *H04N 5/23229* (2013.01); *G06K 9/3208* (2013.01); *G06K 9/46* (2013.01); *G06T 7/13* (2017.01); *G06T 7/73* (2017.01); *H04N 5/23222* (2013.01); *H04N 5/23293* (2013.01); *G06T 2207/10004* (2013.01)

(58) Field of Classification Search
None
See application file for complete search history.

(56) References Cited

U.S. PATENT DOCUMENTS

| | | | |
|---|---|---|---|
| 5,831,670 A | 11/1998 | Suzuki | |
| 8,417,059 B2 | 4/2013 | Yamada | |
| 8,781,164 B2 | 7/2014 | Lee et al. | |
| 2005/0276596 A1 | 12/2005 | Chan et al. | |
| 2007/0291177 A1* | 12/2007 | Lahoz | H04N 5/23293 348/571 |
| 2008/0239086 A1 | 10/2008 | Nakamura | |

(Continued)

OTHER PUBLICATIONS

Extended European search report from the European Patent Office for counterpart European Application No. EP 15 19 2271 completed May 30, 2016.

*Primary Examiner* — Kim Vu
*Assistant Examiner* — Nathan Bloom
(74) *Attorney, Agent, or Firm* — Finnegan, Henderson, Farabow, Garrett & Dunner LLP (57) ABSTRACT

The present disclosure relates to a method and device for assisting a user for capturing an image. In an embodiment, an image is focused by a user of an image capturing device. The image capturing device extracts one or more features from the image being focused. The extracted features are classified into significant features and background features. The image capturing device also extracts one or more line segments in the image. Upon extracting the features and the line segments, the image capturing device determines relation between the features and the line segments. The image capturing device provides assistance to the user for capturing the image based on the relation.

16 Claims, 5 Drawing Sheets

(56) References Cited

U.S. PATENT DOCUMENTS

| | | | | |
|---|---|---|---|---|
| 2010/0177197 A1* | 7/2010 | Kimura | ............... | G06K 9/228 348/208.2 |
| 2011/0157406 A1 | 6/2011 | Tauchi | | |
| 2011/0242348 A1 | 10/2011 | Yana | | |
| 2011/0254861 A1* | 10/2011 | Emura | ............... | G06F 3/0488 345/633 |
| 2013/0201182 A1* | 8/2013 | Kuroki | ............... | G06T 19/20 345/419 |
| 2013/0321591 A1* | 12/2013 | Ohtomo | ............ | H04N 13/0275 348/50 |
| 2014/0023292 A1* | 1/2014 | Yamada | ............. | H04N 5/2628 382/289 |
| 2014/0161323 A1 | 6/2014 | Livyatan et al. | | |
| 2014/0193039 A1* | 7/2014 | Wexler | ............... | G01C 11/04 382/106 |
| 2016/0142625 A1* | 5/2016 | Weksler | ............ | H04N 5/23222 348/222.1 |
| 2016/0171004 A1* | 6/2016 | Zhang | ............. | G06F 17/30271 382/106 |

\* cited by examiner

METHOD AND DEVICE FOR ASSISTING A USER TO CAPTURE IMAGES

PRIORITY CLAIM

This U.S. patent application claims priority under 35 U.S.C. § 119 to: India Application No. 600/CHE/2015, filed on Feb. 6, 2015. The aforementioned application is incorporated herein by reference in its entirety.

TECHNICAL FIELD

The present subject matter is related, in general to image capturing and more particularly, but not exclusively to a method and a device for assisting a user for capturing images.

BACKGROUND

A camera forms an integral part of modern electronic devices like a mobile phone. The mobile phone with camera capabilities registers a picture taken with the mobile phone. The registered picture can be used as a standby screen in display section or it may be transmitted to another mobile phone. At present, mobile phones with camera feature are evolving as a fastest growing segment in the digital camera field.

Digital cameras consider face detection techniques, which enable the user to take better images of the object of interest of the user. Such techniques may employ Local-Binary Pattern (LBP) features and/or Multi-Layer Perceptrons (MLP) based classifiers. These techniques can also be used in the mobile phones with camera feature. The cameras used by professionals include additional advanced features which helps the photographer to capture better images. However, these features may be difficult to be employed or used by a normal user.

Typically, when framing a shot, environmental features that many professional photographers look for and like to incorporate in their shots are converging lines, horizontal lines, leading lines and vertical lines. A normal user of a mobile phone with camera feature focusing on particular subject may not be able to visualize these inherent features that could change the photograph altogether.

The issues mainly faced while capturing the images are to assist the user in real-time for capturing the better quality images.

SUMMARY

Disclosed herein is a method and device for assisting a user for capturing images. The device extracts one or more features in an image being focused. The device also extracts one or more line segments in the image. The device relates the features with the line segments based on which the device assist the user to capture a better quality image.

Accordingly, the present disclosure relates to a method for assisting a user to capture images. The method comprises extracting, by an image capturing device, one or more features from an image being focused, wherein the image is displayed on a display unit of the image capturing device. The method further comprises extracting one or more line segments in the image based on vectorization of the image. Upon extracting the features and the line segments, the method proceeds to determine a relation between the one or more features and the one or more line segments extracted from the image. Further, the method provides assistance to the user for capturing the image based on the relation.

Further, the present disclosure relates to an image capturing device for assisting a user to capture images. The image capturing device comprises a processor and a memory communicatively coupled to the processor, wherein the memory stores processor-executable instructions, which, on execution, cause the processor to extract one or more features from an image being focused, wherein the image is displayed on a display unit of the image capturing device. The processor is further configured to extract one or more line segments in the image based on vectorization of the image. The processor is furthermore configured to determine relation between the one or more features and the one or more line segments extracted from the image and provides assistance to the user for capturing the images based on the relation.

Furthermore, the present disclosure relates to a non-transitory computer readable medium including instructions stored thereon that when processed by at least one processor cause a image capturing device to perform the act of extracting one or more features from an image being focused. Further, the instructions cause the processor to extract one or more line segments in the image based on vectorization of the image. Further, the instructions cause the processor to determine the relation between the one or more features and the one or more line segments and provide assistance to the use for capturing the image based on the relation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and device for assisting a user to capture images. The method comprises extracting one or more features in an image being focused. The focused image is displayed on a display unit of the image capturing device. The device also extracts one or more line segments in the image. The one or more line segments may be vertical lines, horizontal lines, diagonal lines and converging lines. Upon extracting the features and the line segments, the image capturing device determines relation between the features and the line segments in order to provide one or more suggestions to the user for capturing the image. The relation provides information to the user for capturing the better quality image.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1A:
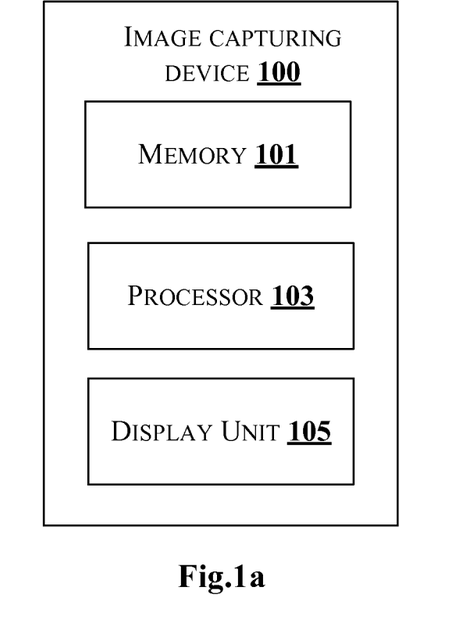
FIG. 1a shows a block diagram illustrating an image capturing device for assisting a user to capture images in accordance with some embodiments of the present disclosure.

FIG. 1a shows a block diagram illustrating an image capturing device 100 for assisting a user to capture images in accordance with some embodiments of the present disclosure.

As shown in FIG. 1a, the image capturing device 100 comprises a memory 101, processor 103 and a display unit 105. As an example, the image capturing device 100 includes, but is not limited to, a camera and any other computing device with image capturing feature. The computing device includes, but is not limited to, a smartphone, a tablet and a laptop. The memory 101 is communicatively coupled to the processor 103. The memory 101 stores processor executable instructions which on execution cause the image capturing device 100 to assist a user for capturing an image. The user may include a person, a person using the image capturing device 100 such as such as those included in this disclosure or the device itself. The display unit 105 is communicatively connected to the processor 103. In an embodiment, the display unit 105 displays an image being focused by the image capturing device 100.

Figure 1B:
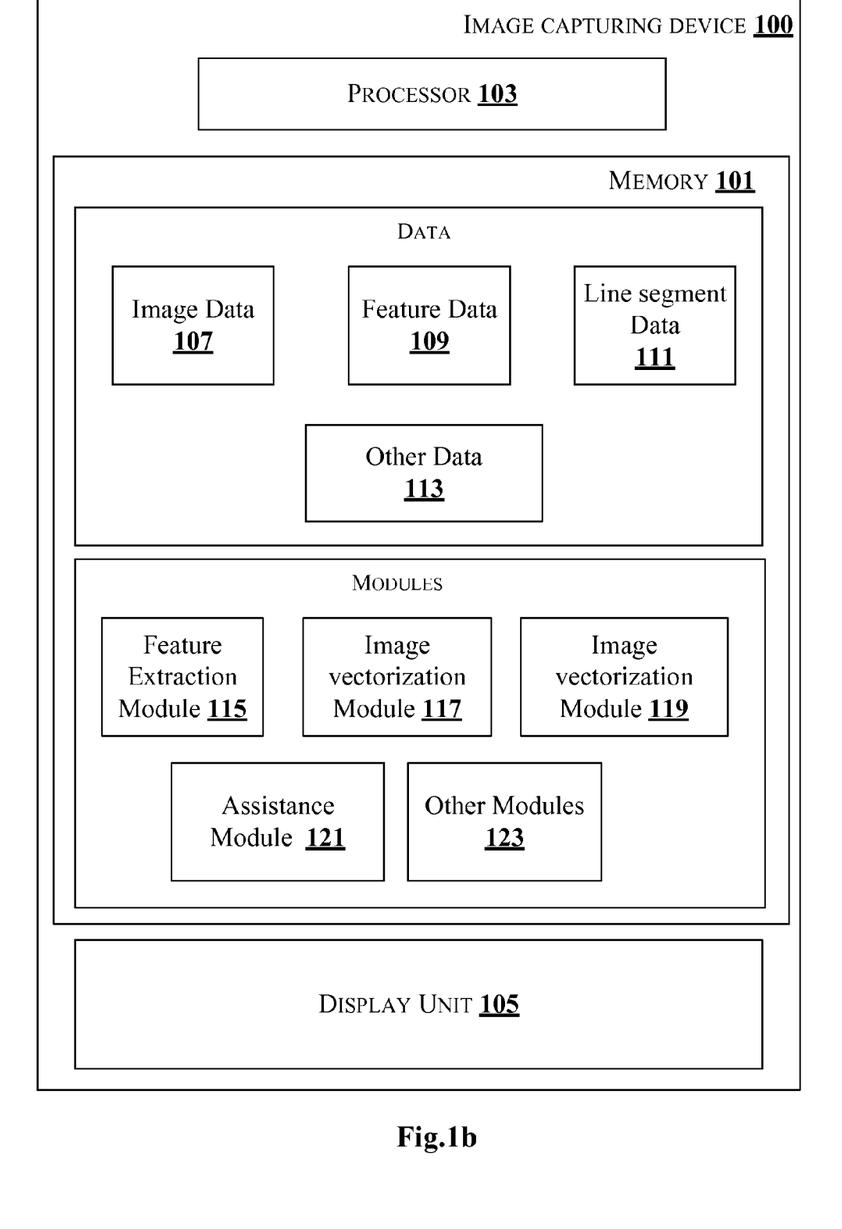
FIG. 1b shows a detailed block diagram illustrating the image capturing device in accordance with some embodiments of the present disclosure.

FIG. 1b shows a detailed block diagram illustrating the image capturing device 100 in accordance with some embodiments of the present disclosure.

In one implementation, the user focuses on an image to be captured using the image capturing device 100. As an example, data of the image being focused is stored within the memory 101. In an embodiment, the data may include an image data 107, a feature data 109, a line segment data 111 and other data 113. In the illustrated FIG. 1b, one or more modules stored in the memory 101 are described herein in detail.

In one embodiment, the data may be stored in the memory 101 in the form of various data structures. Additionally, the aforementioned data can be organized using data models, such as relational or hierarchical data models. The other data 113 may store data, including temporary data and temporary files, generated by modules for performing the various functions of the image capturing device 100.

In an embodiment, the image data 107 comprises information about the image being focused by the user. The user may focus on an image using the image capturing feature in the image capturing device 100. As an example, the image focused may be face of a person. The data associated with face of the person may include, but is not limited to, number of cells/pixels in the image and intensity of each cell in the image.

In an embodiment, the feature data 109 comprises information about one or more features in the image. The one or more features are classified into significant features/target features and background features in the image. The significant features are the object of interest of the user. The background features are those features which are out of focus by the image capturing device 100. As an example, the significant features in the face of the person may be eyes, nose, mouth, chin and sides of face region.

In an embodiment, the line segment data 111 comprises information about one or more line segments in the image. As an example, the one or more line segments may include, but are not limited to, horizontal lines, vertical lines, diagonal lines and converging lines. In an embodiment, the horizontal lines are in the middle of an image frame of the image being focused or on top of the image frame. In an embodiment, a single vertical line is at the center of the image which can be used for dramatic impact of the image but it can also leave the image looking segmented or cut into half. The vertical lines are at the center of the image to add a dramatic touch to the image. In an embodiment, the converging lines head towards a central point in the image. In an embodiment, the diagonal lines are used from bottom left corner to the top right corner of the image.

In an embodiment, the data stored in the memory 101 are processed by the modules 114 of the image capturing device 100. The modules may be stored within the memory 101 as shown in FIG. 1b. In an example, the modules, communicatively coupled to the processor 103, may also be present outside the memory 101. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In one implementation, the modules may include, for example, a feature extraction module 115, an image vectorization module 117, a relation module 119, an assistance module 121 and other modules 123. The other modules 123 may be used to perform various miscellaneous functionalities of the image capturing device 100. It will be appreciated that such aforementioned modules 114 may be represented as a single module or a combination of different modules.

In an embodiment, the feature extraction module 115 is configured to extract one or more features in the image being focused. The extracted features are classified into significant features and background features. The target features are the object of interest of the user. The background features are those features which are not focused by the user but present in the image. As an example, the feature extraction is performed using a technique which includes, but is not limited to, clustering. In an embodiment, any other existent feature extraction technique can be used for the purpose of the present disclosure. In the clustering technique, one or more cells in the image with matching intensity are clustered to extract significant features in the image.

In an embodiment, the image vectorization module 117 is configured to extract one or more line segments in the image. The extracted one or more line segments are highlighted in the image and are displayed on the display unit 105. The extracted line segments includes, but not limited to, horizontal lines, vertical lines, converging lines and diagonal lines. The vectorization of the image is performed for converting bitmaps into vector paths and gradients. The vector represents a series of smooth straight lines instead of raster dots in the image. The gradient represents smooth color variation in the image. As an example, the one or more methods may be used by the image vectorization module 117 for performing vectorization of the image. The one or more methods include, but are not limited to, indexing method, graph method and contour method.

In an embodiment, the relation module 119 is configured to identify a relation between the one or more features and the one or more one or more line segments. As an example, the relation module 119 uses a technique, which includes, but is not limited to, contrast detection. In the contrast detection technique, a relation between a focal point in the image and the significant features in the image are identified. In an embodiment, each cell/pixel in the image is compared with other cells to identify the difference between the cells in terms of intensity variation. Few cells may have maximum intensity and few cells may have minimum intensity. As an example, the intensity is maximum in the corner of the image. The feature in the corner of the image is out of focus by the user. The feature at the corner of the image is correlated with the features having maximum intensity. Further, the relation module 119 identifies the lines which intersect with the extracted features, lines which connect the features with frame of the image, lines which are parallel to the extracted features and lines which fall under the category of extreme mean ratio in the image.

In an embodiment, the assistance module 121 is configured to provide assistance to the user for capturing the image. The assistance is provided by instructing the user to perform one or more actions. In an embodiment, the one or more actions are notified in the image capturing device 100 in at least one of audio and video format. The one or more actions comprise at least one of altering orientation of the image capturing device 100, aligning the target features with the one or more line segments and indicating the one or more features in the image which are out of focus. As an example, a notification may be provided to alter the orientation of the image capturing device 100 by shifting the position of the image capturing device 100 by −1.0 or +0.5 from the current position.

Figure 2:
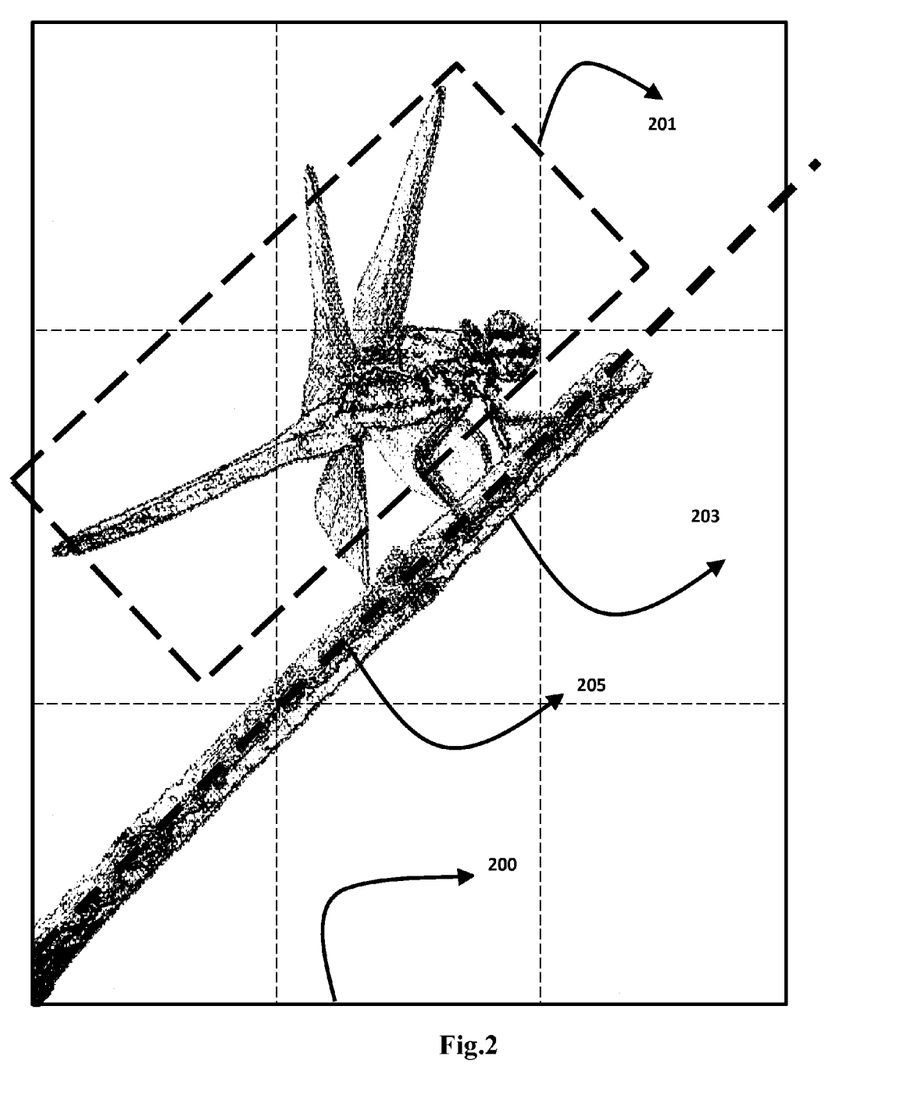
FIG. 2 illustrates an exemplary method for extracting features and line segments in accordance with some embodiments of the present disclosure.

FIG. 2 is an exemplary image 200 being focused by a user of the image capturing device 100. The feature extraction module 115 extracts one or more features from the image. The extracted feature from the image is 201. The extracted feature 201 is the object of interest of the user. The background feature is 203 in the image. The vectorization module 117 extracts one or more line segments from the image. The extracted line segment is the diagonal line which starts from left side of the image. The extracted line segment is 205. The relation module 119 determines the relation between the extracted feature and the line segment. The relation module 119 determines that the extracted feature and the line segment are leading towards right in upward direction. Based on this relation, the assistance module 121 provides suggestions to the user to change the position of the image capturing device 100 for capturing the extracted feature 201 along with the background feature 203. In an embodiment, the suggestion is displayed on the display unit 105 of the image capturing device 100.

Figure 3:
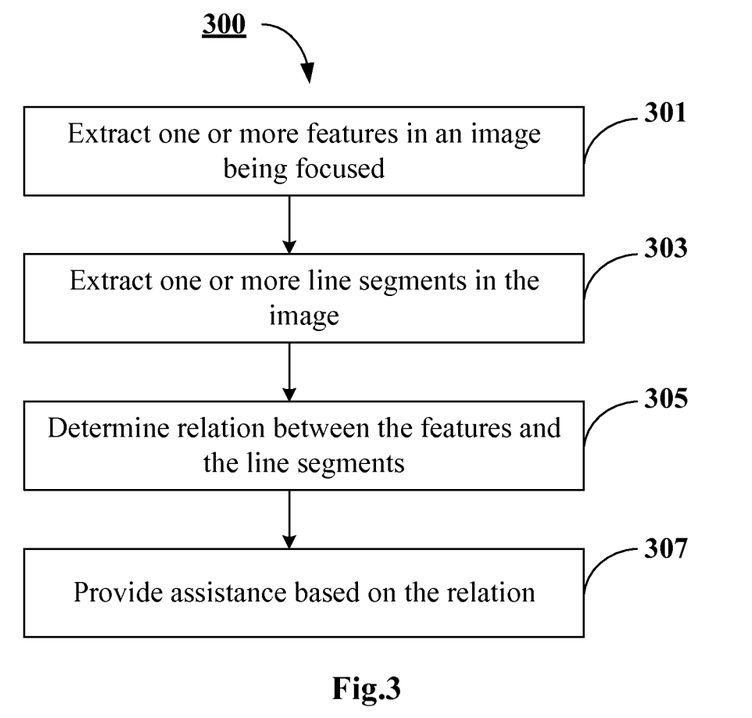
FIG. 3 illustrates a flowchart showing method for assisting a user to capture images in accordance with some embodiments of the present disclosure.

FIG. 3 illustrates a flowchart showing method for assisting user to capture images in accordance with some embodiments of the present disclosure.

As illustrated in FIG. 3, the method 300 comprises one or more blocks for assisting a user for capturing an image using an image capturing device 100. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, one or more features in an image being focussed are extracted. In an embodiment, feature extraction module 115 of the image capturing device 100 extracts one or more features from the image being focussed. The one or more features are classified into target features and background features. The target features are the significant features in the image. As an example, the feature extraction is performed using a technique which includes, but is not limited to, clustering. In the clustering technique, one or more cells in the image with matching intensity are clustered to extract significant features in the image.

At block 303, extract one or more line segments from the image. In an embodiment, image vectorization module 117 of the image capturing device 100 extracts one or more line segments from the image. The extracted one or more line segments are displayed on the display unit 105.

At block 305, relation between the extracted features and the line segments is identified. In an embodiment, the relation module 119 of the image capturing device 100 determines the relation between extracted features and the line segments. The relation between a focal point in the image and the significant features in the image are identified. The relation module 119 compares intensity between each cell in the image to identify the relation between the feature and line segment.

At block 307, the assistance is provided to the user for capturing the image. In an embodiment, the assistance module 121 of the image capturing device 100 provides one or more suggestions to the user based on the relation for capturing the image. The suggestions may for the user to perform one or more actions such as altering orientation of the image capturing device 100, aligning the target features with the one or more line segments and indicating the one or more features in the image which are out of focus.

Computer System

Figure 4:
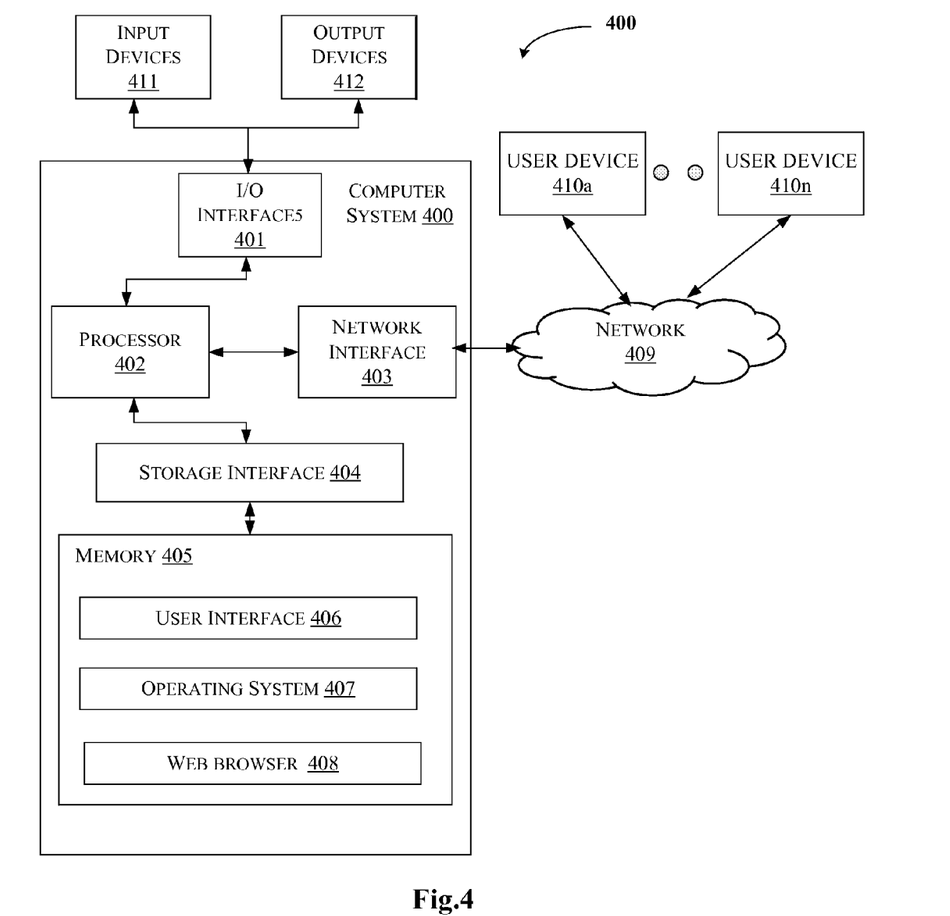
FIG. 4. illustrates a block diagram of an exemplary computer system for implementing embodiments consistent with the present disclosure.

FIG. 4 illustrates a block diagram of an exemplary computer system 400 for implementing embodiments consistent with the present invention. In an embodiment, the computer system 400 is used to provide assistance to a user while capturing images by an image capturing device 100. The computer system 400 may comprise a central processing unit ("CPU" or "processor") 402. The processor 402 may comprise at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more user devices 410 (a, . . . , n). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more user devices 410 (a, . . . , n) may include, without limitation, personal computer(s), mobile devices such as cellular telephones, smartphones, tablet computers, eBook readers, laptop computers, notebooks, gaming consoles, or the like.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface application 406, an operating system 407, web server 408 etc. In some embodiments, computer system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure highlights significant lines in an image frame based on which the user can align the image frame for capturing the image.

In an embodiment, the present disclosure provides suggestions to place the object of interest in a particular position in the image frame.

In an embodiment, the present disclosure provides a method for capturing a better quality image by providing suggestions based on relation between features and line segments in the image.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Image Capturing Device |
| 101 | Memory |
| 103 | Processor |
| 105 | Display Unit |
| 107 | Image Data |
| 109 | Feature Data |
| 111 | Line segment Data |
| 113 | Other Data |
| 115 | Feature Extraction Module |
| 117 | Image Vectorization Module |
| 119 | Relation Module |
| 121 | Assistance Module |
| 123 | Other Modules |
| 200 | Image |
| 201 | Extracted Feature |
| 203 | Background Feature |
| 205 | Extracted Line Segment |

The invention claimed is:

1. A method for providing one or more suggestions to a user to capture images, the method comprising:
   extracting, by an image capturing device focusing on an image, one or more features from the image, wherein the image is displayed on a display unit of the image capturing device;
   extracting, by the image capturing device, one or more line segments in the image that are separated from the one or more features by performing vectorization of the image;
   determining, by the image capturing device, a relation between the one or more features and the one or more line segments extracted from the image by comparing each cell in the image with other cells to identify the difference between the cells in terms of intensity variation;
   determining, by the image capturing device and based on the relation between the one or more features and the one or more line segments, one or more actions to be performed on the image capturing device for aligning a focal point of the image with the one or more features of the image; and
   providing, via a user interface of the image capturing device, by the image capturing device, an indication of the one or more actions.

2. The method as claimed in claim 1, wherein the indication comprises at least one of an audio notification and visual notification instructing the user to perform the one or more actions, wherein the one or more actions comprise at least one of altering orientation of the image capturing device, aligning the target features with the one or more line segments and indicating the one or more features in the image which are out of focus.

3. The method as claimed in claim 1, wherein the one or more features are classified into background features and target features.

4. The method as claimed in claim 1, wherein the one or more line segments are at least one of horizontal lines, vertical lines, converging lines and leading lines.

5. The method as claimed in claim 1, wherein the one or more line segments are highlighted and displayed on the display unit.

6. An image capturing device for providing one or more suggestions to a user to capture images, comprising:
   a processor; and
   a memory communicatively coupled to the processor, wherein the memory stores processor-executable instructions, which, on execution, causes the processor to:
      extract one or more features of an image being focused on, wherein the image is displayed on a display unit of the image capturing device;
      extract one or more line segments in the image that are separated from the one or more features by performing vectorization of the image;
      determine a relation between the one or more features and the one or more line segments extracted from the image by comparing each cell in the image with other cells to identify the difference between the cells in terms of intensity variation;
      determine, based on the relation between the one or more features and the one or more line segments, one or more actions to be performed on the image capturing device for aligning a focal point of the image with the one or more features of the image; and
      provide, via a user interface of the image capturing device, an indication of the one or more actions.

7. The image capturing device as claimed in claim 6, wherein the indication comprises at least one of an audio notification and visual notification instructing the user to perform the one or more actions, wherein the one or more actions comprise at least one of altering orientation of the image capturing device, aligning the target features with the one or more line segments and indicating the one or more features in the image which are out of focus.

8. The image capturing device as claimed in claim 6, wherein the instructions configure the at least one processor to classify the one or more features in the image into background features and target features.

9. The image capturing device as claimed in claim 6, wherein the one or more line segments are at least one of horizontal lines, vertical lines, converging lines and leading lines.

10. The image capturing device as claimed in claim 6, wherein the instructions configure the at least one processor to highlight the one or more line segments and display on the display unit.

11. A non-transitory computer readable medium including instructions stored thereon that when processed by at least one processor cause an image capturing device to perform operations comprising:
   extracting one or more features of an image being focused on, wherein the image is displayed on a display unit of the image capturing device;
   extracting one or more line segments in the image that are separated from the one or more features by performing vectorization of the image;
   determining a relation between the one or more features and the one or more line segments extracted from the image by comparing each cell in the image with other cells to identify the difference between the cells in terms of intensity variation;
   determining, based on the relation between the one or more features and one or more features and the one or more line segments, one or more actions to be performed on the image capturing device for aligning a focal point of the image with the one or more features of the image; and
   providing, via a user interface of the image capturing device, an indication of the one or more actions.

12. The medium as claimed in claim 11, wherein the indication comprises at least one of an audio notification and visual notification instructing the user to perform the one or more actions, wherein the one or more actions comprise at least one of altering orientation of the image capturing device, aligning the target features with the one or more line segments and indicating the one or more features in the image which are out of focus.

13. The medium as claimed in claim 11, wherein the instructions further cause the at least one processor to classify the one or more features in the image into background features and target features.

14. The medium as claimed in claim 11, wherein the one or more line segments are at least one of horizontal lines, vertical lines, converging lines and leading lines.

15. The medium as claimed in claim 11, wherein the instructions further cause the at least one processor to highlight the one or more line segments and display on the display unit.

16. The method of claim 1, wherein extracting one or more line segments in the image comprises at least one of: identifying one or more line segments that intersect with the extracted features, identifying one or more line segments that connect the extracted features with a frame of the image, or identifying one or more lines that are parallel to the extracted features.

* * * * *